US007867541B2

(12) United States Patent
McMahon et al.

(10) Patent No.: US 7,867,541 B2
(45) Date of Patent: Jan. 11, 2011

(54) COMPOSITIONS AND METHODS OF FORMULATION FOR ENTERAL FORMULAS CONTAINING SIALIC ACID

(75) Inventors: Robert J. McMahon, Evansville, IN (US); Mary Frances Locniskar, Lawrence, KS (US); Steven Charles Rumsey, Evansville, IN (US); Joshua C. Anthony, Evansville, IN (US); Ratchapong Wungtanagorn, Bangkok (TH)

(73) Assignee: Mead Johnson Nutrition Company, Evansville, IN (US)

( * ) Notice: Subject to any disclaimer, the term of this patent is extended or adjusted under 35 U.S.C. 154(b) by 884 days.

(21) Appl. No.: 10/413,508

(22) Filed: Apr. 14, 2003

(65) Prior Publication Data

US 2004/0202765 A1    Oct. 14, 2004

(51) Int. Cl.
    *A23C 9/00*    (2006.01)
(52) U.S. Cl. ................. 426/580; 426/648; 426/657
(58) Field of Classification Search ............. 426/580, 426/585, 587, 588, 601, 613, 648, 657
    See application file for complete search history.

(56) References Cited

U.S. PATENT DOCUMENTS

| 4,762,822 | A | 8/1988 | Ettinger .................. 514/25 |
| 4,925,680 | A | 5/1990 | Schweikhardt et al. ......... 426/42 |
| 4,963,384 | A | 10/1990 | Heine et al. ................. 426/580 |
| 5,270,462 | A | 12/1993 | Shimatani et al. ........... 536/17.2 |
| 5,575,916 | A | 11/1996 | Brian et al. ................. 210/634 |
| 5,576,300 | A | 11/1996 | Mukerji et al. ............... 514/21 |
| 5,714,075 | A | 2/1998 | Brian et al. ................. 210/670 |
| 5,849,324 | A | 12/1998 | Dohnalek et al. .......... 424/440 |
| 6,168,823 | B1 | 1/2001 | Etzel ......................... 426/656 |
| 6,270,827 | B1 | 8/2001 | Gaull et al. ................ 426/580 |
| 6,288,222 | B1 | 9/2001 | Roth et al. .................. 536/127 |
| 6,331,418 | B1 | 12/2001 | Roth ........................... 435/97 |
| 6,506,422 | B1 | 1/2003 | Masson et al. ................ 426/2 |
| 6,592,863 | B2 | 7/2003 | Fuchs et al. ................ 424/93.1 |

FOREIGN PATENT DOCUMENTS

| EP | 1 048 226 | 4/1999 |
| WO | WO 98/08402 | 3/1998 |
| WO | WO 99/18808 | 4/1999 |
| WO | WO 01/60346 | 8/2001 |
| WO | WO 03/003847 | 1/2003 |

OTHER PUBLICATIONS

PCT International Search Report (ISR) and Written Opinion (WO), mailed Feb. 13, 2006, , European Patent Office (EPO) International Search Authority (ISA), International Application No. PCTUS2005/035637, International Filing Date Sep. 30, 2005.

Database WPI Section Ch, Week 199632 Derwent Publications Ltd., London, GB; AN 1989-109958 & JP 02 514375 BS (Snow Brand Milk Prod Co Ltd) Jul. 10, 1996.

European Patent Application No. EP-A-0 385 118 (Snow Brand Milk Products & Co., Ltd; Snow Brand Milk Products Co., Ltd) Sep. 5, 1990.

Wang B et al: "Effect of dietary sialic acid supplementation on saliva content in piglets." Asia Pacific Journal of Clinical Nutrition. 2004, vol. 13, No. Suppl, 2004, p. S75, XP008058895 ISSN: 0964-7058.

Patent Abstracts of Japan, vol. 1996, No. 02, Feb. 29, 1996 & JP 07 277929 A (Momotani Jiyuntenkan:KK; others: 01), Oct. 24, 1995 abstract.

Patent Cooperation Treaty (PCT), International Search Report (ISR) Completion date of ISR Aug. 20, 2004, Mailing date of ISR Sep. 27, 2004 International Application No. PCT/US2004/008451, International Filing Date Mar. 19, 2004.

Patent Cooperation Treaty (PCT), Written Opinion of the International Searching Authority Completion date of ISR Aug. 20, 2004, Mailing date of ISR Sep. 27, 2004 International Application No. PCT/US2004/008451, International Filing Date Mar. 19, 2004.

Abstract from Journal of Japanese Society of Nutrition and Food Science, 1994 (Nihon Eiyo Shokury Gakkai-shi), vol. 47, No. 5, 1994, pp. 363-367, (T. Idota, et al) Entitled: *Changes in the sialyllactose content of human milk during lactation*.

Abstract from Food Science & Technology, 2002, 16 (3) 38, 39, 41, (J. Gerritsen) Entitled: *Long-chain polyunsaturated fatty acids in infant nutrition*.

Abstract from British Journal of Nutrition, vol. 84, No. 1, 2000, pp. 103-109 (F. Marangoni, et al) Entitled: *Polyunsaturated fatty acid concentrations in human hindmilk are stable throughout 12-months of lactation and provide a sustained intake to the infant during exclusive breastfeeding: an Italian study*.

Abstract from Am J Clin Nutr 2001;74:510-5 (Wang B et al.), entitled Sialic Acid in Human Milk and Formula.

Abstract by Heine et al. from Monatsschr Kinderheilkd. Dec. 1993;141(12):946-50, entitled Sialic Acid in Breast Milk and Infant Formula Food.

Abstract by Nakano et al. from Acta Paediatr Taiwan. Jan.-Feb. 2001;42(1):11-7, entitled Sialic Acid in Human Milk: Composition and Functions.

Abstract by Svennerholm et al. from Biochim Biophys Acta. Sep. 25, 1989;1005(2):109-17, entitled Human Brain Gangliosides: Developmental Changes From Early Fetal Stage to Advanced Age.

Article published online on the Glycoforum website under GlycoWord/Glycolipid-A04 (Jun. 15, 1999) entitled N-Glycolylneuraminic Acid and N-Acetylneuraminic Acid. Online at http://www.glycoforum.gr.jp/science/word/glycolipid/GL-A04E. html, Apr. 4, 2003.

(Continued)

*Primary Examiner*—Leslie Wong
(74) *Attorney, Agent, or Firm*—Waddey & Patterson, P.C.; James R. Cartiglia

(57) ABSTRACT

A nutritionally complete infant formula containing sialic acid derived from one or a number of nutritionally appropriate sources is described.

5 Claims, No Drawings

OTHER PUBLICATIONS

Abstract published online on the Everybody website under Nutrition Research with Professor John Birkbeck (Nutrition update Oct. 10, 2001) entitled Sialic Acid in Human Milk and Formula. Online at http://www.everybody.co.nz/nutrition/nnoct10_01sialic.html, Apr. 4, 2003.

Article published in Am J Clin Nutr (2001) vol. 74, pp. 510-515 by Bing Wang et al. entitled Concentration and Distribution of Sialic Acid in Human Milk and Infant Formulas.

Abstract published online on the PubMed website of article published in J Paediatr Child Health (Aug. 1997) vol. 33, No. 4, pp. 281-286 by P. McVeagh and J.B. Miller entitled Human Milk Oligosaccharides: Only the Breast.

Article published in J Pediatr (2001) vol. 138, pp. 914-916 by Bing Wang et al. entitled a Longitudinal Study of Salivary Sialic Acid in Preterm Infants: Comparison of Human Milk-Fed versus Formula-Fed Infants.

Article published in Archives of Disease in Childhood (1997) vol. 77, pp. 315-318 by T.H. Tram et al. entitled Sialic Acid Content of Infant Saliva: Comparision of Breast Fed with Formula Fed Infants.

Article published in Journal of Pediatric Gastroenterology and Nutrition (1997) vol. 24, pp. 405-410 by Alberto Sanchez-Diaz et al. entitled a Critical Analysis of Total Sialic Acid and Sialoglycoconjugate Contents of Bovine Milk-Based Infant Formulas.

Article published in Biosci. Biotech. Biochem. (1994) vol. 58, No. 9, pp. 1720-1722 by Tadashi Idota et al. entitled Growth-Promoting Effects of N-Acetylneuraminic Acid-Containing Substances on Bifidobacteria.

Article published in Virology (2002) vol. 302, pp. 33-43 by Niklas Arnberg et al. entitled Adenovirus Type 37 Binds to Cell Surface Sialic Acid Through a Charge-Dependent Interaction.

Article published in Hoppe-Seyler's Z. Physiol. Chem. (Nov. 1981) vol. 362, pp. 1495-1506 by Ulrich Nohle and Roland Schauer entitled Uptake, Metabolism and Excretion of Orally and Intravenously Administered, $^{14}$C- and $^{3}$H-Labeled N-Acetylneuraminic Acid Mixture in the Mouse and Rat.

Article published in Nutr. Metab. (1979) vol. 23, pp. 51-61 by W. Witt et al. entitled Uptake and Distribution of Orally Applied N-Acetyl-($^{14}$C)neuraminosyl-lactose and N-Acetyl-($^{14}$C)neuraminic Acid in the Organs of Newborn Rats.

Article published in Hoppe-Seyler's Z. Physiol. Chem. (Dec. 1984) vol. 365, pp. 1457-1467 by Ulrich Nohle and Roland Schauer entitled Metabolism of Sialic Acids from Exogeneously Administered Sialyl-lactose and Mucin in Mouse and Rat.

Article published in Comp. Biochem. Physiol. (1998) vol. 119A, No. 1, pp. 435-439 by Bing Wang et al. entitled Sialic Acid Concentration of Brain Gangliosides: Variation Among Eight Mammalian Species.

Article published in J. Nutr. (1986) vol. 116, pp. 881-886 by Susan E. Carlson and Stephen G. House entitled Oral and Intraperitoneal Administration of N-Acetylneuraminic Acid: Effect on Rat Cerebral and Cerebellar N-Acetylneuraminic Acid.

Article published in Am J Clin Nutr (1985) vol. 41, pp. 720-726 by Susan E. Carlson entitled N-Acetylneuraminic Acid Concentrations in Human Milk Oligosaccharides and Glycoproteins during Lactation.

Article published in Br. J. Nutr. (1981) vol. 46, pp. 231-238 by Brian L. G. Morgan and Myron Winick entitled The Subcellular Localization of Administered N-Acetylneuraminic Acid in the Brains of Well-Fed and Protein Restricted Rats.

Article published in J. Nutr. (1980) vol. 110, pp. 416-424 by Brian L. G. Morgan and Myron Winick entitled Effects of Administration of N-Acetylneuraminic Acid (NANA) on Brain NANA Content and Behavior.

Article published in Pediatrics (Jan. 1998) vol. 101, No. 1, p. E9 by L. John Horwood and David M. Fergusson entitled Breastfeeding and Later Cognitive and Academic Outcomes.

COMPOSITIONS AND METHODS OF FORMULATION FOR ENTERAL FORMULAS CONTAINING SIALIC ACID

FIELD OF THE INVENTION

The present invention relates generally to infant's and children's nutritional formulas containing sialic acid and methods for manufacturing such formulas.

BACKGROUND OF THE INVENTION

Sialic acid is a naturally occurring component of human breast milk, where it is found associated with various oligosaccharides and glycoproteins. While human breast milk contains substantial amounts of sialic acid, most infant formulas contain less than 25% of the sialic acid found in colostrum. Moreover, 70% of the sialic acid in formulas is glycoprotein-bound, unlike human breast milk in which 75% of sialic acid is bound to oligosaccharides. See Heine, W., et al., *Monatsschr Kinderheilkd* 141:946-50 (1993), Wang, B., et al., *Am J Clin Nutr* 74:510-5 (2001), and Nakano, T., et al, *Acta Paediatr Taiwan* 42:11-17 (2001). Not surprisingly, the accumulation of sialic acid by breast-fed infants is generally higher than for formula-fed infants. See Wang, B., et al., *J Pediatr* 138:914-6 (2001). Evidence suggests that N-acetyineuraminic acid (NANA, or sialic acid) is important in the development and function of the neonatal brain where it is a major component of gangliosides. See Carlson, S. E., *Am J Clin Nutr* 41:720-6 (1985), Morgan, B. and Winnick, M., J Nutr 110:416-24 (1980), Svennerholm, L., et al., *Biochim Biophys Acta* 1005:109-17 (1989), and Wang, B., et al., *Comp Biochem Physiol A Mol Integr Physiol* 435-9 (1998). Therefore, infants fed commercial formulas may not be acquiring sufficient quantities of a nutrient important for early development.

Cow's milk-based formulas generally have low sialic acid content. In one study, the concentration of sialic acid in several casein/whey combination formulas was less than 200 mg sialic acid/L. Moreover, soy protein-based formulas contain substantially reduced levels of sialic acid as compared to cow's milk-based formula. Therefore, formulas that are both lactose free and soy protein-based would exhibit very low sialic acid content.

There are several known sources of sialic acid in its various conjugated forms. These include, but are not limited to, free N-acetylneuraminic acid (or sialic acid), the oligosaccharide sialyllactose, sialic acid-containing gangliosides, and the protein casein macropeptide (CMP), also referred to as glycomacropeptide (GMP).

The addition of sialic acid or sources of sialic acid to certain nutritional formulas is somewhat known in the art. For example, U.S. Pat. No. 6,506,422 discloses a particular nutritional formula containing casein glycomacropeptide and complimentary essential amino acids other than phenylalanine for administration to patients suffering from phenylketonuria. The levels of sialic acid found in infant formulas are not mentioned.

U.S. Pat. No. 6,270,827, discloses a formulation containing human milk proteins or recombinant host resistance factors, one of which is recombinant human kappa-casein, to supplement synthetic infant formulas.

U.S. Pat. No. 4,762,822 discloses the use of N-acetylneuraminic acid or gangliosides containing sialic acid in infant formula to protect the newborn from gastrointestinal disease-producing organisms.

International patent application WO 01/60346 A2 discloses a nutritional formulation containing the oligosaccharides oligofructose and sialyllactose as prebiotic substances to promote the growth of bifidobacteria in the gut that may be used in conjunction with infant formula.

While the use of sialic acid and sialic acid sources in infant formula appears to be present in some of the prior art, the particular features of the present invention which provide a nutritionally complete infant formula with enhanced amounts of sialic acid similar to breast milk are absent therefrom.

SUMMARY OF THE INVENTION

Briefly, the present invention is directed to a novel infant formula and a method of formulating such a nutritionally complete formula that is suitable to support normal growth and development of infants and children. Specifically, this composition includes one or a combination of nutritionally appropriate source(s) of sialic acid. The level of sialic acid in the formula is designed to mimic the total sialic acid found in breast milk over the period of 0-12 months of lactation.

Certain of the innovative aspects of the invention involve the combination of appropriate ingredients to achieve sialic acid levels that mimic that found in breast milk, based on the sialic acid content of the various source ingredients. This invention is directed to a composition and a method of formulating milk protein-based formulas, both with and without lactose, non-milk-based formulas, including soy protein-based formulas, amino acid formulas, and rice protein formulas, that contain sialic acid at concentrations comparable to that found in human milk. The nature and novelty of the invention involves the appropriate selection of sialic acid-containing ingredients to achieve both appropriate sialic acid levels as well as appropriate nutrients for specific infant and children's formulas.

For example, in cow's milk protein-based formulas that contain lactose, the supplemental sialic acid in this composition may come from one or a combination of sources, particularly free sialic acid (neuraminic acid), 3'-sialyllactose, 6'-sialyllactose, or other sialic acid-containing oligosaccharide, and casein glycomacropeptide (cGMP) or other sialic acid-containing milk protein fraction, including whey protein. The sialyllactose conjugate(s) used in this invention may replace a portion of the lactose customarily used in these formulations, while the casein glycomacropeptide (cGMP) and other milk protein fractions may replace a portion of the protein fraction of the formula. In the case of lactose-free formulas, which are also milk protein-free, free sialic acid, other non-cow's milk protein fractions containing sialic acid, or sialic acid-containing oligosaccharides other than lactose may be used. The fat, vitamin, and mineral concentrations of these compositions are otherwise nutritionally appropriate for infants. The total concentration of sialic acid in these formulations would mimic that found in breast milk and may typically be within a range of about 250 mg/L (as found in mature human breast milk) to about 1500 mg/L (as found in human colostrums).

DETAILED DESCRIPTION OF THE PREFERRED EMBODIMENTS

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment.

Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

The present invention provides a nutritionally complete formulation that includes one or more sources of sialic acid, in amounts which mimic the concentration of sialic acid found in human breast milk. The present invention additionally provides a method of making such formulations, in the form of milk protein-based formulas, both with and without lactose, non-milk-based formulas, including soy protein-based formulas, amino acid formulas, and rice protein formulas.

The form of administration of and incorporation of sialic acid in the method of the present invention is not critical, as long as an effective amount is administered. A convenient form of administration is to add sialic acid to an infant formula (including those for both term and preterm infants), follow-on formula, toddler's beverage, milk, yogurt, or fermented product. Alternatively, sialic acid can be administered as a supplement that is not part of a formula feeding such as, for example, drops, sachets or combinations with other nutrients such as vitamins. Sialic acid can be also added to other nutrients suitable for feeding to young children such as, for example, solid baby food, fruit juices, gelatines, cookies, candies, etc. Other examples of administering sialic acid in nutrients can be developed by a person with ordinary skill in the art of infant and child nutrition. All these forms of sialic acid administration, as well as others, are within the scope of the present invention.

In one embodiment of the invention, sialic acid is administered as part of an infant formula. The infant formula for use in the present invention is, typically, nutritionally complete and contains suitable types and amounts of lipids, carbohydrates, proteins, vitamins and minerals. The amount of lipids or fats typically can vary from about 3 to about 7 g/100 kcal. The amount of proteins typically can vary from about 1 to about 5 g/100 kcal. The amount of carbohydrates typically can vary from about 6 to about 16 g/100 kcal. Protein sources can be any used in the art, and may include, for example, nonfat milk, whey protein, casein, soy protein, hydrolyzed protein, and amino acids. Lipid sources can be any used in the art such as, for example, vegetable oils such as palm oil, soybean oil, palm olein oil, corn oil, canola oil, coconut oil, medium chain triglyceride oils, high oleic sunflower oil, and high oleic safflower oil. Carbohydrate sources can be any known in the art such as, for example, lactose, glucose polymers, corn syrup solids, maltodextrins, sucrose, starch, and rice syrup solids.

Conveniently, several commercially available infant formulas can be used as the basic formula for the sialic acid or sialic acid-sources additions. For example, Enfamil® Lipil with iron (available from Mead Johnson & Company, Evansville, Ind., U.S.A.) may be supplemented with an effective amount of sialic acid and used to practice the method of the present invention. Particular infant formulas suitable for use in the present invention are described in the Examples herein.

The total protein in the formulation from all protein sources should be nutritionally appropriate for infants, which is typically from about 12 g per liter to 18 g per liter and, in some embodiments, may be about 14 g per liter. The total sialic acid in the formulation may be between about 250 and about 1500 mg per liter and, in one embodiment, between about 300 and about 600 mg per liter. The formulation may contain one or a combination of the following sialic acid-containing protein components: (1) Up to 100% of the protein fraction from a whey protein concentrate, as commercially available from several sources including Davisco, New Zealand Milk, or Formost Farms, exhibiting about 20-30 mg sialic acid per gram of protein and, thus, contributing between about 140 and about 560 mg sialic acid per liter of formula; (2) up to 100% of the protein fraction from a nonfat dry milk product, as commercially available from several sources including New Zealand Milk, exhibiting about 2-10 mg sialic acid per gram protein and, thus, contributing between about 27 and about 139 mg sialic acid per liter of formula; and (3) up to 6 mg per liter of casein glycomacropeptide (cGMP) or related protein fraction, as commercially available from various sources, exhibiting between about 40 and about 300 mg sialic acid per gram of protein and, thus, contributing between about 194 and about 1458 mg sialic acid per liter of formula.

When cGMP is employed, the particular casein glycomacropeptide used in the protein source is not critical to the invention. For example, the caseino-glyco-macropeptide may be extracted from milk using suitable processing. For example, the casein glycomacropeptide may be extracted from the retentate obtained from the concentration of whey protein. This may be done by at least partially removing lactose from the retentate and then adding ethanol to cause precipitation. The supernatant is then collected and dried to provide the casein glycomacropeptide. U.S. Pat. No. 5,216,129, which is incorporated herein entirely by reference thereto, provides a more detailed description of this process. Alternatively, the casein glycomacropeptide may be purchased from commercial sources. For example, the casein glycomacropeptide may be purchased from MD Foods Ingredients amba of DK-6920 Videbaek, Denmark or from DMV International of NCB-laan 80, NL-5460 BA Veghel, The Netherlands.

The remainder of the components of the formula, including fats, carbohydrates, vitamins, and minerals, should be nutritionally appropriate for infants, as found for example in various commercial formulas such as Enfamil with LIPIL, Similac with Iron, or Similac Advance.

The infant formula supplemented with sialic acid for use in the present invention can be made using standard techniques known in the art. For example, sialic acid can be added to the formula by replacing an equivalent amount of other proteins or oligosaccharides.

The following examples describe exemplary embodiments of the invention. Other embodiments within the scope of the claims herein will be apparent to one skilled in the art from consideration of the specification or practice of the invention as disclosed herein. It is intended that the specification, together with the examples, be considered to be exemplary only, with the scope and spirit of the invention being indicated by the claims which follow the examples. In the examples all percentages are given on a weight basis unless otherwise indicated.

Example 1

This example illustrates the nutrient components in a commercial infant formula suitable for sialic acid addition for use in the present invention.

TABLE 1

Nutrient Information for Infant Formula
(Enfamil ® Lipil with Iron)

| | Per 100 Calories (5 fl oz) |
|---|---|
| NUTRIENTS (Normal Dilution) | |
| Protein, g | 2.1 |
| Fat, g | 5.3 |
| Carbohydrate, g | 10.9 |
| Water, g | 134 |
| Linoleic acid, mg | 860 |
| Vitamins: | |
| A, IU | 300 |
| D, IU | 60 |
| E, IU | 2 |
| K, µg | 8 |
| Thiamin (Vitamin B1), µg | 80 |
| Riboflavin (Vitamin B2), µg | 140 |
| B6, µg | 60 |
| B12, µg | 0.3 |
| Niacin, µg | 1000 |
| Folic acid (Folacin), µg | 16 |
| Pantothenic acid, µg | 500 |
| Biotin, µg | 3 |
| C (Ascorbic acid), mg | 12 |
| Choline, mg | 12 |
| Inositol, mg | 6 |
| Minerals: | |
| Calcium, mg | 78 |
| Phosphorus, mg | 53 |
| Magnesium, mg | 8 |
| Iron, mg | 1.8 |
| Zinc, mg | 1 |
| Manganese, µg | 15 |
| Copper, µg | 75 |
| Iodine, µg | 10 |
| Selenium, µg | 2.8 |
| Sodium, mg | 27 |
| Potassium, mg | 108 |
| Chloride, mg | 63 |

The ingredients of this particular formula are: reduced minerals whey, nonfat milk, vegetable oil (palm olein, soy, coconut, and high oleic sunflower oils), lactose, and less than 1%: mortierella alpina oil, crypthecodinium cohnii oil, vitamin A palmitate, vitamin D3, vitamin E acetate, vitamin K1, thiamin hydrochloride, vitamin B6 hydrochloride, vitamin B12, niacinamide, folic acid, calcium pantothenate, biotin, sodium ascorbate, inositol, calcium chloride, calcium phosphate, ferrous sulfate, zinc sulfate, manganese sulfate, cupric sulfate, sodium chloride, sodium citrate, potassium citrate, potassium hydroxide, sodium selenite, taurine, nucleotides (adenosine 5'-monophosphate, cytidine 5'-monophosphate, disodium guanosine 5'-monophosphate, disodium uridine 5'-monophosphate).

To use this particular formula to practice the present invention, it would be necessary to add, for example, from about 250 mg per liter to about 1500 mg per liter of sialic acid-containing ingredients to the composition described in Table 1. This added amount of sialic acid would be part of the total amount of protein (total protein of approximately 2.1 grams per 100 calories).

Example 2

This example illustrates a particular protein source combination for a total sialic acid content of approximately 250 mg per liter. The ingredients listed in Table 2 would be used to replace the protein component of the formula described in Table 1.

TABLE 2

Protein Source Composition A

| Ingredient | mg SA/gm protein | % of protein in ingredient | g ingredient/ L | g protein/ L | mg SA/L |
|---|---|---|---|---|---|
| Whey Protein Concentrate | 23.00 | 35.00 | 20.26 | 7.09 | 163.08 |
| Nonfat Dry Milk, Low Heat | 6.37 | 34.00 | 15.38 | 5.23 | 33.31 |
| cGMP | 52.00 | 81.00 | 1.45 | 1.17 | 61.07 |

Note:
SA in table refers to sialic acid

Example 3

This example illustrates a particular protein source combination for a total sialic acid content of approximately 360 mg per liter. The ingredients listed in Table 3 replace the protein component of the formula described in Table 1.

TABLE 3

Protein Source Composition B

| Ingredient | mg SA/gm protein | % of protein in ingredient | g ingredient/ L | g protein/ L | mg SA/L |
|---|---|---|---|---|---|
| Whey Protein Concentrate | 23.00 | 35.00 | 37.00 | 12.95 | 297.85 |
| cGMP | 52.00 | 81.00 | 1.45 | 1.17 | 61.07 |

Note:
SA in table refers to sialic acid

Example 4

This example illustrates a particular protein source combination for a total sialic acid content of approximately 600 mg per liter. The ingredients listed in Table 4 replace the protein component of the formula described in Table 1.

TABLE 4

Protein Source Composition B

| Ingredient | mg SA/gm protein | % of protein in ingredient | g ingredient/ L | g protein/ L | mg SA/L |
|---|---|---|---|---|---|
| Whey Protein Concentrate | 23.00 | 35.00 | 13.00 | 4.55 | 104.65 |
| cGMP | 52.00 | 81.00 | 12.00 | 9.72 | 505.44 |

Note:
SA in table refers to sialic acid

Example 5

Table 5 illustrates one possible complete nutritional formulation of an infant formula with a total sialic acid content of approximately 250 mg per liter.

TABLE 5

| Ingredient | Weight | Amount per 10000 liters |
|---|---|---|
| Lactose (95% Solids) | | 573.000 kg |
| Fat Blend | | 332.500 kg |
| Whey Protein Concentrate (36% Protein, 5.8% Ash) | | 202.578 kg |
| Nonfat Milk Solid (36% Prot., 52% CHO) | | 153.844 kg |
| Caseino Glyco Macro Peptides (cGMP, 81.18% Prot.) | | 14.500 kg |
| Mono-and Diglycerides | | 7.233 kg |
| Calcium Phosphate, Tribasic | | 6.520 kg |
| Single Cell Arachidonic Acid Oil | | 6.485 kg |
| Dry Vitamin Premix for Enfamil AR Liquid | | 5.250 kg |
| Ascorbic Acid | 2924.250 g | |
| Inositol | 834.750 g | |
| Corn Syrup Solid | 654.938 g | |
| Taurine | 582.750 g | |
| Niacinamide | 119.438 g | |
| Calcium Pantothenate | 44.730 g | |
| Vitamin B12, 0.1% in Starch | 29.400 g | |
| Biotin, 1% Trituration | 25.095 g | |
| Thiamine Hydroxhloride | 13.913 g | |
| Riboflavin | 10.238 g | |
| Pyridoxine Hydrochloride | 8.138 g | |
| Folic Acid | 2.363 g | |
| Lecithin Concentrate | | 3.694 kg |
| Potassium Citrate | | 3.350 kg |
| Single Cell Docosahexaenoic Acid Oil | | 3.243 kg |
| Nucleotide Premix for Enfamil Powder | | 2.900 kg |
| Maltodextrin, 15 DE | 2552.290 g | |
| Cytidine 5'-monophosphate, free acid | 202.710 g | |
| Uridine 5'-monophosphate, disodium salt | 59.740 g | |
| Adenosine 5'-monophosphate, free acid | 47.357 g | |
| Guanosine 5'-monophosphate, disodium salt | 37.903 g | |
| Carrageenan | | 2.826 kg |
| Magnesium Chloride | | 1.657 kg |
| Calcium Chloride, Dihydrate | | 1.200 kg |
| Choline Chloride | | 0.700 kg |
| Ferrous Sulfate Heptahydrate | | 0.682 kg |
| Sodium Citrate, Dihydrate, Granular | | 0.455 kg |
| Trace Mineral Premix w/Selenite Trituration | | 0.392 kg |
| Zinc Sulfate, Monohydate | 276.238 g | |
| Sodium Selenite Trituration, 0.5% | 65.907 g | |
| Cupric Sulfate, powder | 29.510 g | |
| Lactose, Grind A | 16.323 g | |
| Manganese Sulfate, monohydrate | 4.022 g | |
| Vitamin A,D,E,K Premix, Enfamil Liquid | | 0.324 kg |
| Tocopherol Acetate | 160.882 g | |
| Soybean Oil | 139.612 g | |
| Vitamin A Palmitate | 17.253 g | |
| Cholecalciferol Concentrate | 5.715 g | |
| Vitamin K1, Liquid | 0.538 g | |
| Ascorbic Acid | | 0.150 kg |
| L-Carnitine | | 0.150 kg |
| Water, Defluoridated, q.s. to | | 10310.986 kg |
| Potassium Hydroxide | | — |

Table 6 and Table 7 detail the content of specific components of the formulation described in Table 5 as a percentage of 1) weight to weight, 2) weight to volume, and 3) calories. The specific gravity of this particular formulation is 1.0310986.

TABLE 6

| Component | % w/w | % w/v |
|---|---|---|
| Protein | 1.38 | 1.42 |
| Fat | 3.50 | 3.61 |
| Carbohydrate | 7.20 | 7.43 |
| Ash | 0.37 | 0.38 |
| Total Solids | 12.45 | 12.84 |

TABLE 7

Caloric Distribution

| Component | % |
|---|---|
| Protein | 8.38 |
| Fat | 47.83 |
| Carbohydrate | 43.79 |

Example 6

Table 8 illustrates the nutritional content of the formulation presented in Example 5 per 100 calories, as well as per 100 milliliters of formula.

TABLE 8

| | Per 100 Cal | Per 100 ml |
|---|---|---|
| Calories, Cal | 100 | 68 |
| Protein, g | 2.1 | 1.42 |
| Fat, g | 5.3 | 3.6 |
| Carbohydrate, g | 10.9 | 7.4 |
| Linoleic Acid, mg | 860 | 580 |
| Linolenic Acid, mg | 80 | 54 |
| Arachidonic Acid, mg | 34 | 23 |
| Docosahexaenoic Acid, mg | 17 | 11.5 |
| Vitamin A, IU | 300 | 200 |
| Vitamin D, IU | 60 | 41 |
| Vitamin E, IU | 2 | 1.35 |
| Vitamin K1, mcg | 12 | 8.1 |
| Thiamin, mcg | 120 | 81 |
| Riboflavin, mcg | 140 | 95 |
| Vitamin B6, mcg | 60 | 41 |
| Vitamin B12, mcg | 0.5 | 0.3 |
| Niacin, mcg | 1200 | 812 |
| Folic Acid, mcg | 16 | 10.8 |
| Pantothenic Acid, mcg | 500 | 340 |
| Biotin, mcg | 3 | 2 |
| Vitamin C, mg | 14 | 9.5 |
| Choline, mg | 12 | 8.1 |
| Inositol, mg | 6 | 4.1 |
| Taurine, mg | 6 | 4.1 |
| L-Carnitine, mg | 2 | 1.35 |
| Calcium, mg | 78 | 53 |
| Phosphorus, mg | 53 | 36 |
| Magnesium, mg | 8 | 5.4 |
| Iron, mg | 1.8 | 1.2 |
| Zinc, mg | 1 | 0.68 |
| Manganese mcg | 26 | 17.6 |
| Copper, mcg | 85 | 57 |
| Iodine, mcg | 15 | 10 |
| Sodium, mg | 27 | 18.3 |
| Potassium, mg | 108 | 73 |
| Chloride, mg | 63 | 43 |
| Selenium, mcg | 2.8 | 1.89 |
| Sialic acid, mg | 37 | 25 |
| Calcium/Phosphorus Ratio | — | — |
| AMP Equivalents, mg (a) | 0.5 | 0.34 |
| CMP Equivalents, mg (a) | 2.5 | 1.69 |
| GMP Equivalents, mg (a) | 0.3 | 0.20 |
| UMP Equivalents, mg (a) | 0.9 | 0.61 |
| Nucleotide Equivalents, mg (a) | 4.2 | 2.84 |
| TPAN-AMP, mg | — | — |
| TPAN-CMP, mg | — | — |
| TPAN-GMP, mg | — | — |
| TPAN-UMP, mg | — | — |
| Total TPAN, mg | — | — |
| TPAN-CMP/TPAN-GMP Ratio | — | — |

Note:
Sum of the nucleotide and corresponding nucleoside expressed as the nucleotide weights.

These and other modifications and variations to the present invention may be practiced by those of ordinary skill in the art, without departing from the spirit and scope of the present invention, which is more particularly set forth in the appended claims. In addition, it should be understood that aspects of the various embodiments might be interchanged both in whole and in part. Furthermore, those of ordinary skill in the art will appreciate that the foregoing description is by way of example only, and is not intended to limit the invention so further described in such appended claims. Therefore, the spirit and scope of the appended claims should not be limited to the description of the preferred versions contained therein.

All references cited in this specification, including without limitation all papers, publications, patents, patent applications, presentations, texts, reports, manuscripts, brochures, books, internet postings, journal articles, periodicals, and the like, are hereby incorporated by reference into this specification in their entireties. The discussion of the references herein is intended merely to summarize the assertions made by their authors and no admission is made that any reference constitutes prior art. Applicants reserve the right to challenge the accuracy and pertinency of the cited references.

What is claimed is:

1. A method of formulating a nutritionally complete infant formula, comprising the steps of:
   combining between about 3 to about 7 g/100 kcal of a lipid component, between about 6 and about 16 g/100 kcal of a carbohydrate component, a vitamin component, a mineral component, and a protein component to form a composition substantially free of lactose,
   wherein the composition's protein component has a total protein content of about 12 to about 15 grams/liter of infant formula and wherein the protein component comprises an amount of casein glycomacropeptide sufficient to provide a total sialic acid content of from about 250 mg to about 1500 mg sialic acid per liter of infant formula.

2. The method of claim 1 wherein said formula further comprises one or more sialic acid-containing oligosaccharide(s).

3. The method of claim 2 wherein the amount of sialic acid-containing oligosaccharide and casein glycomacropeptide is sufficient to achieve a total sialic acid content of from 300 mg per liter of formula to about 600 mg per liter of infant formula.

4. The method of claim 1, wherein the infant formula further comprises docosahexaenoic acid and arachidonic acid.

5. The method of claim 1, wherein the infant formula further comprises protein in an amount from about 1 g to about 5 g/100 kcal of the infant formula.

* * * * *